(12) United States Patent
Demandt et al.

(10) Patent No.: US 9,336,964 B2
(45) Date of Patent: May 10, 2016

(54) ELECTRICAL CIRCUIT BREAKER

(75) Inventors: Rob Joseph Catharina Emiel Demandt, Elsloo (NL); Johannes Hoekstra, Lieshout (NL); Robert Hendrik Catharina Janssen, Beek (NL)

(73) Assignee: DSM IP ASSETS B.V., Heerlen (NL)

( * ) Notice: Subject to any disclaimer, the term of this patent is extended or adjusted under 35 U.S.C. 154(b) by 266 days.

(21) Appl. No.: 13/805,112

(22) PCT Filed: Jun. 17, 2011

(86) PCT No.: PCT/EP2011/060113
§ 371 (c)(1),
(2), (4) Date: Feb. 28, 2013

(87) PCT Pub. No.: WO2011/157825
PCT Pub. Date: Dec. 22, 2011

(65) Prior Publication Data
US 2013/0200046 A1 Aug. 8, 2013

(30) Foreign Application Priority Data

Jun. 18, 2010 (EP) .................... 10166433

(51) Int. Cl.
*H01H 9/30* (2006.01)
*C09K 21/00* (2006.01)
*C08K 5/3492* (2006.01)
*C08K 3/22* (2006.01)
*C08K 7/14* (2006.01)
*C08L 77/00* (2006.01)

(52) U.S. Cl.
CPC .............. *H01H 9/30* (2013.01); *C08K 5/3492* (2013.01); *C09K 21/00* (2013.01); *H01H 9/302* (2013.01); *C08K 3/2279* (2013.01); *C08K 7/14* (2013.01)

(58) Field of Classification Search
CPC ......... H01H 9/34; H01H 9/302; H01H 9/342; H01H 9/346
USPC .......................... 218/150, 156, 158
See application file for complete search history.

(56) References Cited

U.S. PATENT DOCUMENTS 7,541,902 B2    6/2009  Domejean et al.
8,076,581 B2 *  12/2011 Schmidt .................. 174/110 SR
(Continued)

FOREIGN PATENT DOCUMENTS

EP    1 313 121     5/2003
JP    11-335534     12/1999
JP    2000-119494   4/2000

OTHER PUBLICATIONS

International Search Report for PCT/EP2011/060113, mailed Oct. 4, 2011.
(Continued)

*Primary Examiner* — Renee S Luebke
*Assistant Examiner* — William Bolton
(74) *Attorney, Agent, or Firm* — Nixon & Vanderhye P.C.

(57) ABSTRACT

The invention relates to an electrical circuit breaker comprising an arc formation chamber and an arc extinguishing chamber, the arc formation chamber being at least partially bounded by a side flange or at least a part of a side wall consisting of a polymeric composition comprising a thermoplastic polymer, a triazine based flame retardant, at most 0-5 wt. % of phosphorous or halogen containing flame retardants, and 0-15 wt. % of a reinforcing agent, wherein thermoplastic polymer comprises a polyamide with a melting temperature of at least 260° C. and the triazine based flame retardant comprises at least 20 wt. % of melam, wherein the weight percentages (wt. %) are relative to the total weight of the polymeric composition.

6 Claims, 1 Drawing Sheet

(56) References Cited

U.S. PATENT DOCUMENTS

2008/0290068 A1 11/2008 Domejean et al.
2009/0264562 A1 10/2009 Schellekens et al.
2009/0266794 A1 10/2009 Heydendorf et al.

OTHER PUBLICATIONS

Written Opinion of the International Searching Authority for PCT/EP2011/060113, mailed Oct. 4, 2011.

* cited by examiner

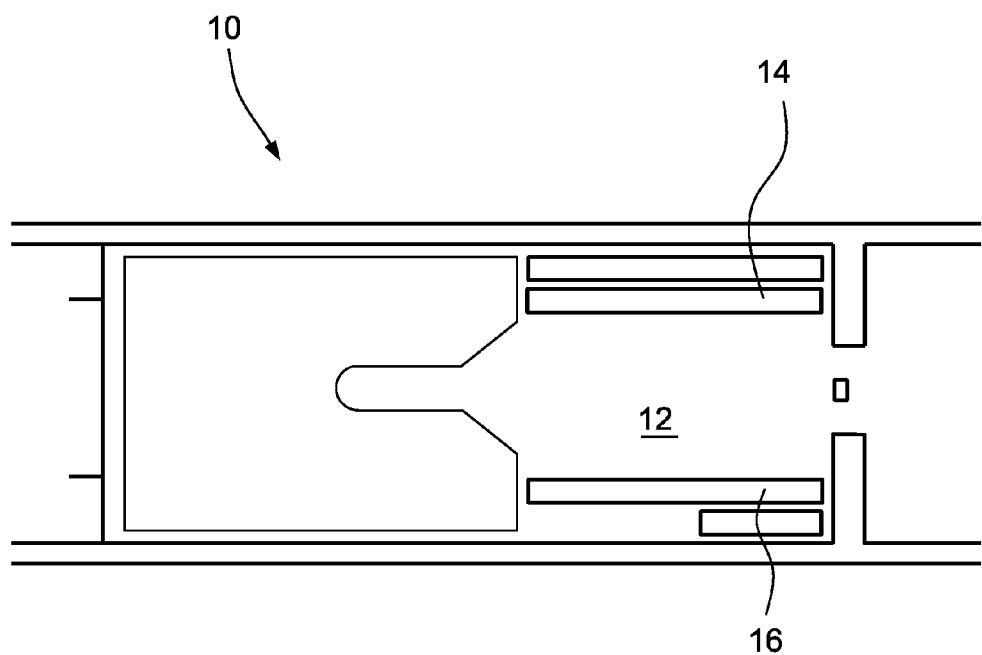

ELECTRICAL CIRCUIT BREAKER

This application is the U.S. national phase of International Application No. PCT/EP2011/060113, filed 17 Jun. 2011, which designated the U.S. and claims priority to EP Application No. 10166433.2, filed 18 Jun. 2010, the entire contents of each of which are hereby incorporated by reference.

FIELD

The invention relates to an electrical circuit breaker, in particular to high end low voltage circuit breakers such as molded case circuits breakers.

BACKGROUND AND SUMMARY

A circuit breaker is an automatically-operated electrical switch designed to protect an electrical circuit from damage caused by overload or short circuit. Its basic function is to detect a fault condition and, by interrupting continuity, to immediately discontinue electrical flow. Unlike a fuse, which operates once and then has to be replaced, a circuit breaker can be reset (either manually or automatically) to resume normal operation. Circuit breakers are made in varying sizes, from small devices that protect an individual household appliance up to large switchgear designed to protect high voltage circuits feeding an entire city.

All circuit breakers have common features in their operation, although details vary substantially depending on the voltage class, current rating and type of the circuit breaker. Low voltage (less than 1000 VAC) type electrical circuit breakers are common in domestic, commercial and industrial application, and include: miniature and mini circuit breakers (MCBs), mmolded case circuit breakers (MCCBs), residual-current devices (RCDs) and circuit breakers that combine the functions of an RCD with overcurrent protection (RCBOs). Circuit breakers typically comprise a casing or housing molded from thermoplastic or thermoset materials. Some further characteristics of circuit breakers are the following: MCB (Miniature Circuit Breaker)—rated current generally not more than 125 A; trip characteristics are normally not adjustable. MCCB (Molded Case Circuit Breaker)—rated current up to 1000 A, and functioning through thermal or thermal-magnetic operation; trip current may be adjustable in larger ratings. RCDs, MCBs, MCCBs, RCDs and RCBOs have in common that all typically comprise a housing molded from thermoplastic or thermoset materials. MCCBs, RCDs and RCBOs are described for example by K. Kuboyama and A. Kohanawa in Fuji electronic review, Vol. 52, No. 4, pages 112-118.

A circuit breaker must detect a fault condition; in low-voltage circuit breakers this is usually done within the breaker enclosure. Once a fault is detected, contacts within the circuit breaker must open to interrupt the circuit. Small circuit breakers may be manually operated (also work with a solenoid for short circuit and a bi-metal for thermal tripping); larger units have solenoids to trip the mechanism, and electric motors to restore energy to the springs. The circuit breaker contacts must carry the load current without excessive heating, and must also withstand the heat of the arc produced when interrupting the circuit. Contacts are made of copper or copper alloys, silver alloys, and other materials. Service life of the contacts is limited by the erosion due to interrupting the arc. Miniature and molded case circuit breakers are usually discarded when the contacts are worn, but power circuit breakers and high-voltage circuit breakers have replaceable contacts. When a current is interrupted, an arc is generated. This arc must be contained, cooled, and extinguished in a controlled way, so that the gap between the contacts can again withstand the voltage in the circuit. A high arcing voltage and a high shutting speed are important. Finally, once the fault condition has been cleared, the contacts must again be closed to restore power to the interrupted circuit.

Low voltage circuit breakers typically comprise an arc formation chamber (or arcing chamber) and an arc extinguishing chamber (or arc chute). The arc extinguishing chamber typically comprises a stack of so-called deionizing plates or arc splitter plates, typically made of metal. Different circuit breakers use vacuum, air, insulating gas, or oil as the medium in which the arc forms. Different techniques are used to extinguish the arc. Low-voltage circuit breakers comprise an arcing chamber wherein gas generated by the arc is expanded. Miniature low-voltage circuit breakers the arc is extinguished under air. Larger ratings circuit breakers such as some mini-circuit breakers and MCCBs typically contain metal splitter plates, or non-metallic arc chutes to absorb energy, to divide and cool the arc, and reduce the conductivity of the gases. Magnetic blowout coils can be used to deflect the arc into the arc chute.

From the prior art electrical circuit breakers comprising an arc chute equipped with side flanges are known. US 2008/0290068 describes an arc chute comprising an arc extinguishing chamber formed by a stack of deionizing plates and an arc formation chamber bounded by a first and second flange, said arc chute being equipped with permanent magnets arranged behind at least the first flange, in which the arc formation chamber comprises: an enhanced induction section where the arc is propelled towards the arc extinguishing chamber by a first part of the permanent magnets, and a diverting section where the arc is diverted towards the first flange by a second part of the permanent magnets, the magnetic field in the longitudinal mid-plane generated by the second part being substantially weaker than that generated by the first part. The flanges in these electrical circuit breakers are made of isolating material.

U.S. Pat. No. 7,541,902B relates to the field of switchgear devices in particular enabling direct currents to be broken, in particular low-intensity currents, i.e. comprised between 0.5 and 150 Amperes. U.S. Pat. No. 7,541,902B describes a circuit breaker comprising an arc chute for comprising an arc extinguishing chamber formed by a stack of deionizing plates and an arc formation chamber bounded by a first and second flange, said arc chute being equipped with permanent magnets arranged behind at least the first flange. According to one embodiment, the first flange is made of ceramic material, while the second flange is made of gas-generating organic material.

EP1313121A1 describes electrical circuit breakers, comprising an arc-extinguishing member including a molded arc-extinguishing insulating material mainly containing a non-halogenous flame retardant. The non-halogenous flame retardant can be chosen from many different materials including organic triazine compounds, such as melamine cyanurate. The matrix resin in the arc-extinguishing insulating material can be chosen from different materials, including polyamides, such as non-aromatic polyamides.

A problem with low voltage electrical switch gears is their limitation in maximum arc switch voltage that is built up, the switching speed and retention of performance after multiple short circuitry interruptions.

The aim of the invention is to provide an electrical circuit breaker, wherein problems as described above are reduced, at least to some extent.

This aim has been achieved with the electrical circuit breaker according to the present invention, comprising an arc formation chamber being at least partially bounded by a side flange consisting of a flame retardant polymeric composition comprising a thermoplastic polymer, a flame retardant system comprising a triazine based flame retardant and 0-5 wt. % of phosphorous or halogen containing flame retardants, and 0-15 wt. % of a reinforcing agent, wherein thermoplastic polymer comprises a polyamide with a melting temperature of at least 260° C. and the triazine based flame retardant comprises at least 20 wt. % of melam, wherein the weight percentages (wt. %) are relative to the total weight of the composition.

BRIEF DESCRIPTION OF THE DRAWING

The accompanying drawing Figure shows a cross-sectional plan view of an exemplary arc formation chamber associated with an electrical circuit breaker that embodies the invention as described herein.

DETAILED DESCRIPTION

The effect of the circuit breaker according to the invention, wherein the arc formation chamber is at least partially bounded by a side flange consisting of such a polymeric composition, is that the maximum applicable switching voltage increases, allowing faster switching times and less energy dissipation, With the term melting point (temperature) is herein understood the temperature, measured according to ASTM D3417-971D3418-97 by DSC with a heating rate of 10° C./min, falling in the melting range and showing the highest melting rate.

In the electrical circuit breaker according to the invention the arc extinguishing chamber suitably comprises metal splitter plates. With the better retention of the dielectric strength within the electrical circuit breaker the presence of such metal plates is less critical.

The function of a flange inserted in the housing of the circuit breaker can also be performed by a side wall or side walls, or a part or parts thereof, of the housing of the circuit breaker, depending on the design thereof, if such side walls or parts thereof can be made of the material identical to that used for the flanges. Although it would be possible to construct the complete circuit breaker housing from the said flame retardant composition, which could be interpreted as a housing wherein the side flange or side flanges constitute an integral part of the circuit breaker housing, it will be difficult to integrate all the mechanical, electrical and other properties in the circuit breaker housing as required for a proper functioning of the housing.

The accompanying Figure shows a cross-sectional elevational view of a circuit breaker arc chute 10 which comprises an arc formation chamber 12 at least partially bounded by side flanges 14 and 16. In a preferred embodiment, the side flange or side flanges 14, 16 consist of individual plastic parts which can be inserted in the housing to at least partially bound the arc formation chamber 12. This has the advantage that no modifications in the design of the electrical circuit breaker are needed, that the original design can be retained without giving in on other properties such as strength of the housing, while at the same time the overall performance is increased.

In a preferred embodiment, the electrical circuit breaker is a molded case circuit breaker (MCCB). The housing of the MCCB suitably is made of a thermoset material, whereas the side flange or side flanges inserted in the arc formation chamber consist of individual plastic parts made of the polymeric composition comprising a thermoplastic polymer.

The thermoplastic polymer used in the polymeric composition is a polyamide with a melting temperature of at least 260° C. This can be, for example, an aliphatic polyamide or a semi-aromatic polyamide, preferably an aliphatic polyamide. Examples of suitable aliphatic polyamides are polyamide 66 and polyamide 46, as well as copolymers of polyamide 66 with other aliphatic polyamides and copolymers of polyamide 66 with other aliphatic polyamides, provided the melting temperature is at least 260° C. Suitably the melting temperature is in the range of 260-350° C., although polyamides with a higher melting temperature might be used as well.

Suitably, the polyamide with a melting temperature of at least 260° C. is present in an amount of 30-70 wt. %, relative to the total weight of the composition.

The polymeric composition from which the side flange or at least part of the side walls in the present invention is made comprises melam and a thermoplastic polyamide with a melting point of at least 260° C.

Next to the melam, the composition may comprise limited amounts of other flame retardants, such as phosphorous flame retardants, nitrogen containing flame retardants, or even halogen containing flame retardants. Suitable nitrogen containing are triazine based flame retardants.

The polymeric composition may comprise, next to melam, other flame retardant components, such as phosphorous flame retardants, nitrogen containing flame retardants other than melam, or even halogen containing flame retardants. However, for a proper functioning of the side flange in the circuit breaker, the amount of phosphorous or halogen containing flame retardants has to be kept limited. Preferably the total amount thereof should be at most 5 wt. %, i.e. the composition comprises 0-5 wt. % of phosphorous or halogen containing flame retardants,More preferably, the polymeric composition is halogen free and the amount of phosphorous or halogen containing flame retardants is in the range of 0-5 wt. %. Also the amount of nitrogen containing flame retardants other than melam, of which melamine and melamine cyanurate are examples, should be kept limited. Preferably the amount of nitrogen containing flame retardants other than melam is in the range of 0-5 wt. %. It is noted that the weight percentages (wt. %), mentioned hereabove, are all relative to the total weight of the composition.

Melam is a condensation product of melamine. Preferably, the flame retardant system comprises at least 70 wt. % melam, relative to the total weight of the flame retardant system. More preferably, the amount of melam is 80-100 wt. % melam, or even 90-100 wt. %, relative to the total weight of the flame retardant system.

The higher the content of melam, in the polymeric composition is, the better is the performance of the electrical circuit breaker. Preferably the amount of melam is at least 20 wt. %, more preferably at least 30wt. %, relative to the total weight of the polymeric composition. The amount may be as high as 45 wt. % or even higher, but suitably is at most 40 wt. %. Overall, preferably melam is present in an amount of 20-45 wt. %, more preferably 30-40 wt. %, relative to the total weight of the polymeric composition.

Next to the thermoplastic polymer and the triazine based flame retardant, the composition suitably comprises other components, such as reinforcing agents, inorganic fillers, and auxiliary additives.

The fibrous reinforcement material in the polymeric composition suitably is glass fibers. Suitable inorganic fillers include talcum and wollastonite. The presence of glass fibers is favorable for the retention of the dielectric strength. Too high an amount has a negative impact on the arcing voltage. Suitably the glass fibers are present in an amount in the range 0-15 wt, preferably 5-10 wt. % relative to the total weight of the polymeric composition.

In a specific embodiment of the invention, the polymeric composition used for the side flange or flanges or parts of the side walls of the arc formation chamber consist of:
- a. 30-70 wt. % of a polyamide with a melting temperature of at least 260° C.;
- b. 20-40 wt. % of melam;
- c. 5-10 wt. % of fibrous reinforcement material;
- d. 0-40 wt. % of an inorganic filler; and
- e. 0-20 wt. % of other components.

Herein the weight percentages (wt. %) are relative to the total weight of the polymeric composition.

The other components herein can be for example, auxiliary additives and polymers other than the polyamide with a melting temperature of at least 260° C. Such other polymer may be chosen from different polymers, in particular those that can withstand higher temperatures. Preferably, the other polymer is a thermoplastic polymer chosen from the groups of lower melting polyamides, polyesters, polyphenylene ethers (PPE) and polyphenylene sulfides (PPS). The invention will be further illustrated with the following examples (EX) and comparative experiments (CE).

Tests

Flanges were produced from flame retardant compositions and inserted in a MCCB made of a thermoset material which was tested on arcing voltage and retention of dielectric strength under normal use conditions. The components in the compositions and the rating of the test results are listed in Table 1.

The flame retardant polymer compositions used for the production of the flanges were produced using standard raw materials, standard melt extrusion equipment and standard melt compounding procedures. PA46, or polyamide 46, is a polyamide with a melting temperature of 295° C. PA66, or polyamide 66, is a polyamide with a melting temperature of 265° C.

TABLE 1

Compositions and rating of the test results for examples (EX) I-IV and comparative experiments (CE) A-C.

|  | EX-I | EX-II | CE-A | CE-B | CE-C | CE-D | CE-E |
|---|---|---|---|---|---|---|---|
| (I) Compositions (wt. %) |  |  |  |  |  |  |  |
| PA66 | 54 |  |  |  | 49 | 59 | 56 |
| PA46 |  | 69 |  | 49 |  |  |  |
| PA6 |  |  | 49 |  |  |  |  |
| Melam | 40 | 30 |  | 30 |  |  |  |
| Melamine cyanurate |  |  | 40 |  |  |  |  |
| Melamine Polyphosphate |  |  |  |  | 30 | 40 |  |
| Polybromostyrene |  |  |  |  |  |  | 20 |
| Antimonytrioxide |  |  |  |  |  |  | 3 |
| Glass fibers | 5 | 0 | 10 | 20 | 20 | 0 | 20 |
| Auxiliary additive packages | 1 | 1 | 1 | 1 | 1 | 1 | 1 |
| (II) Rating test results [a] |  |  |  |  |  |  |  |
| Arcing voltage | 2 | 1 | 3 | 4 | 6 | 7 | 5-7 |

[a] rating is from best (1) to worst (7)

The invention claimed is:

1. An electrical circuit breaker comprising an arc formation chamber and an arc extinguishing chamber, the arc formation chamber being at least partially bounded by a side flange or at least a part of a side wall consisting of a polymeric composition comprising:
   a thermoplastic polymer which comprises a polyamide with a melting temperature of at least 260° C.,
   a triazine based flame retardant system comprising 70-100 wt. % of melam relative to the total weight of the flame retardant system, the flame retardant system being present in an amount such that the melam is present in an amount of at least 20 wt. % relative to the total weight of the polymeric composition,
   at most 0-5 wt. % of phosphorous or halogen containing flame retardants, relative to the total weight of the polymeric composition, and
   0-15 wt. % of a reinforcing agent, relative to the total weight of the polymeric composition.

2. The electric circuit breaker according to claim 1, wherein the electric circuit breaker is a molded case circuits breaker (MCCB).

3. The electrical circuit breaker according to claim 1, wherein the arc formation chamber comprises two side flanges consisting of individual plastic parts inserted in the arc formation chamber.

4. The electrical circuit breaker according to claim 1, wherein melam is present in an amount of 20-40 wt. %, relative to the total weight of the polymeric composition.

5. The electrical circuit breaker according to claim 1, wherein the polymeric composition consists of:
   (a) 30-70 wt. % of a polyamide with a melting temperature of at least 260° C.,
   (b) 20-40 wt. % of melam;
   (c) 5-10 wt. % of fibrous reinforcement material;
   (d) 0-40 wt. % of an inorganic filler; and
   (e) 0-20 wt. % of other components; wherein
   the weight percentages (wt. %) are relative to the total weight of the polymeric composition.

6. The electrical circuit breaker according to claim 1, wherein melam is present in an amount of 30-40 wt. %, relative to the total weight of the polymeric composition.

* * * * *